United States Patent [19]
Baerlocher et al.

[11] 3,818,031
[45] June 18, 1974

[54] IMIDAZOLIDINETRIONECARBOXYLIC ACID DERIVATIVES

[75] Inventors: Toni Baerlocher, Oberwil, Baselland, Switzerland; Edith Ebert, Loerrach-Stetten, Germany

[73] Assignee: Ciba-Geigy Corporation, Ardsley, N.Y.

[22] Filed: Mar. 24, 1972

[21] Appl. No.: 237,926

[30] Foreign Application Priority Data
Mar. 26, 1971  Switzerland.......................... 4514/71
May 6, 1971  Switzerland........................ 11653/71

[52] U.S. Cl............................. 260/309.5, 424/273
[51] Int. Cl............................................ C07d 49/30
[58] Field of Search................................ 260/309.5

[56] References Cited
UNITED STATES PATENTS

| | | | |
|---|---|---|---|
| 2,895,817 | 7/1959 | Luckenbaugh | 71/2.5 |
| 3,418,334 | 12/1968 | Stoffel | 260/309.5 |
| 3,433,799 | 3/1969 | Huber | 260/309.5 |
| 3,461,133 | 8/1969 | Stoffel | 260/309.5 |
| 3,468,905 | 9/1969 | Kohn et al. | 260/326 |

*Primary Examiner*—John D. Randolph
*Assistant Examiner*—G. Thomas Todd
*Attorney, Agent, or Firm*—Karl F. Jorda

[57] ABSTRACT

Esters and thioesters of 2,4,5-trioxo-imidazolidin-3-carbonic acid are useful ingredients for influencing plant metabolism. They may be used preferably for fruit abscission and for inhibiting senescence of cut plants.

32 Claims, No Drawings

IMIDAZOLIDINETRIONECARBOXYLIC ACID DERIVATIVES

The present invention relates to imidazolidinetrionecarboxylic acid derivatives, to processes for their production, also to agents for the control of plant metabolism which agents contain these new compounds as active substances, as well as to processes for the control of metabolism, particularly for the control of fruit abscission and of senescence by application of the new active substances or of agents containing them.

The new compounds correspond to formula I:

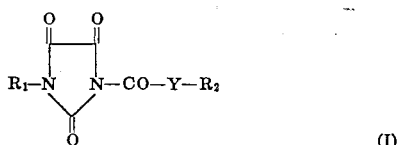

(I)

The new compounds may also be designated as parabanic acid derivatives. The symbols in formula I have the following meanings:

$R_1$ represents hydrogen, an alkyl, alkenyl, alkinyl radical, a cycloaliphatic radical, or an alkoxycarbonyl or alkylthio-carbonyl radical, an alkyl radical substituted by cycloalkyl, alkoxy, alkoxycarbonyl, alkoxyalkoxycarbonyl, alkylthio, dialkylamino or by halogen, an alkenyloxyalkyl radical, a phenyl radical optionally substituted by halogen, nitro, lower alkyl, alkoxy, halogenoalkyl or cyano, the tetrahydro-3-thienyl-S,S-dioxide radical, a benzyl or phenylethyl radical optionally ring-substituted by halogen, nitro and/or lower alkyl, or a tetrahydrofurfuryl radical;

$R_2$ represents an alkyl, alkenyl, alkinyl radical, a cycloaliphatic radical, or an alkyl radical substituted by cycloalkyl, alkoxyalkoxycarbonyl, alkenyloxy, alkoxy or halogen, a phenyl radical optionally substituted by halogen, nitro, lower alkyl, halogenoalkyl or cyano, a benzyl or phenylethyl radical optionally ring-substituted by halogen, nitro and/or lower alkyl, or a furfuryl or tetrahydrofurfuryl radical;

Y represents an oxygen or a sulphur atom. The possible addition salts with organic or inorganic acids are also included in formula I.

The compounds of formula I, therefore, are

Ia: (Y = O) carbonic esters, or

Ib: (Y = S) carbonic thioesters.

Alkyl radicals in formula I are straight-chain or branched radicals having one to 18 carbon atoms, such as, e.g. methyl, ethyl, n-propyl, isopropyl, n-butyl, isobutyl, sec-butyl, tert-butyl, n-pentyl, n-hexyl, n-octyl, n-decyl, n-undecyl, n-dodecyl, n-tetradecyl, n-hexadecyl, n-octadecyl and the isomers of $C_5$–$C_{18}$-alkyl radicals. Particularly the lower straight-chain and branched alkyl radicals, i.e. such ones having one to six carbon atoms, form the alkyl moiety of alkoxy-, alkylthio- or dialkylamino-substituted alkyl radicals or phenyl radicals. With regard to halogenoalkyl radicals, these are lower alkyl radicals having 1 to 4 carbon atoms, which can be substituted by fluorine, chlorine, bromine and/or iodine, such as, e.g. trifluoromethyl, β-fluoroethyl, β-chloroethyl, β-bromoethyl, β-iodoethyl, etc. By alkenyl radicals are meant in formula I straight-chain or branched radicals having three to 18 carbon atoms; the allyl, methallyl and crotyl radicals are preferred. These alkenyl radicals can be mono- or polysubstituted by halogen, such as fluorine, chlorine, bromine and/or iodine. Alkinyl radicals preferably contain three to five carbon atoms in a straight chain; those preferred are propinyl and butinyl radicals such as the 2-propinyl radical or a propinyl radical substituted by lower alkyl. To be mentioned as cycloaliphatic radicals $R_1$ and/or $R_2$ are mono- and polycyclic cycloalkyl and cycloalkenyl radicals having three to 12 carbon atoms. Monocyclic cycloalkyl radicals are preferred such as, e.g. cyclopropyl, cyclopentyl, cyclohexyl, cycloheptyl, cyclooctyl, cyclododecyl. These cycloalkyl radicals can moreover be substituted by lower alkyl radicals, e.g. by methyl, ethyl, n-propyl, isopropyl or by n-butyl, tert-butyl, sec-butyl, isobutyl.

Of the compounds of formula I, those are preferred in which $R_1$ and $R_2$ independently represent an alkyl radical having up to eight carbon atoms, a chloro- or bromoalkyl radical having up to four carbon atoms, an alkoxyalkyl radical having up to five carbon atoms, an alkenyl, chloroalkenyl or bromoalkenyl radical having up to four carbon atoms, a propinyl or butinyl radical, a cycloalkyl radical having up to six carbon atoms, which can also be bound by way of a methyl, ethyl, n-propyl or n-butyl radical, a benzyl or phenylethyl radical optionally mono- to tri-ring-substituted by chlorine, bromine, iodine, cyano, methyl, ethyl, nitro, or a phenyl radical optionally mono-to tri-substituted by chlorine, bromine, iodine, cyano, methyl, ethyl, methoxy, ethoxy, nitro, trifluoromethyl; and $R_1$ can, moreover, represent hydrogen, whilst Y stands for oxygen or sulphur.

If Y represents oxygen, then of the last-mentioned compounds those particularly important are compounds in which $R_1$ and $R_2$ independently represent methyl, ethyl, n-propyl, isopropyl, n-butyl, isobutyl, sec.butyl, tert.butyl, n-amyl, isoamyl, n-hexyl, chloroethyl, chloro-propyl, bromoethyl, bromopropyl, allyl, methallyl, chloroallyl, bromoallyl, propargyl, cyclopropyl, cyclopropyl-methyl, a benzyl radical optionally monosubstituted by chlorine, methyl or nitro, or a phenyl radical optionally mono- or disubstituted by chlorine, bromine, methoxy, methyl, and $R_1$ can, moreover, also represent hydrogen.

If Y represents sulphur, then those compounds are especially important in which $R_1$ represents hydrogen, methyl, ethyl, n-propyl, isopropyl, n-butyl, isobutyl, sec.butyl, tert.butyl, n-amyl, isoamyl, n-hexyl, chloroethyl, chloropropyl, bromoethyl, bromopropyl, allyl, methallyl, chloroallyl, bromoallyl, propargyl, cyclopropyl, cyclopropylmethyl, benzyl, or a phenyl radical optionally mono- or disubstituted by chlorine, bromine, methoxy, methyl, and $R_2$ represents methyl, ethyl, n-propyl, isopropyl, n-butyl, isobutyl, sec. butyl, tert.butyl, n-amyl, isoamyl, a benzyl radical optionally monosubstituted by chlorine, methyl or nitro, or a phenyl radical optionally mono- or disubstituted by chlorine bromine, methyl or ethyl.

Compounds of formula I having a particularly good action with regard to initiating the abscission of fruit are the compounds in which Y represents oxygen or sulphur, and one of the two substituents $R_1$ and $R_2$ represents an alkenyl radical and the other an alkyl radical, or both substituents represent an alkyl radical, the number of carbon atoms of $R_1$ and $R_2$ together being between 3 and 6.

The compounds of formula I are produced, for example, by the cyclisation of a urea of formula II:

(II)

with a functional derivative of oxalic acid, i.e. optionally with an oxalyl halide, preferably oxalyl chloride or oxalyl bromide, or with an oxalyl halide semi-ester, preferably oxalyl chloride lower alkyl ester (J. prakt. Chemie 32, 18), or with an oxalic acid lower alkyl ester, to obtain a 2,4,5-trioxoimidazolidine derivative of formula III:

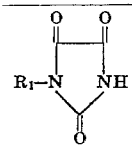

(III)

and the subsequent reaction of this with a halogen(thio)formic acid ester of formula IV:

(IV)

wherein Y represents an oxygen or sulphur atom, in the presence of an acid-binding agent. In formulae II to IV, $R_1$, $R_2$ and Y have the meanings given under formula I, and X represents halogen preferably chlorine or bromine.

The conversion of compounds of formula III into compounds of formula I can be effected moreover in a different manner by reaction with a tert.-amine, preferably with a tert.-alkylamine such as triethylamine, to give salts of formula V:

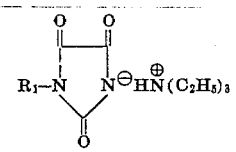

(V)

and reaction of these salts in a solvent with phosgene, as well as further reaction of the chlorocarbamoyl compounds formed as intermediates optionally (Ia) with an alcohol or phenol of the formula HO—$R_2$, or (Ib) with a mercaptan of the formula HS—$R_2$.

The reactions are performed in the presence of solvents or diluents inert to the reactants. The reaction temperatures are within the range of −50° to +110°C.

The following may be used as solvents or diluents inert to the reactants: aliphatic and aromatic hydrocarbons and halogenated hydrocarbons, such as benzene, toluene, xylenes, petroleum ether, chlorobenzene, methylene chloride, ethylene chloride, chloroform, carbon tetrachloride, ethers and ethereal solvents such as dialkyl ether, dioxane, tetrahydrofuran; preferably halogenated alkanes such as methylene chloride, ethylene chloride, chloroform and carbon tetrachloride.

Inorganic and organic bases serve as acid-binding agents for the process according to the invention. The reaction of a urea of formula II with an oxalyl halide can be performed in the presence of inorganic bases. For the introduction of the COY$R_2$-group, an acid-binding agent in the form of an inorganic or organic base is required. Suitable inorganic bases are hydroxides, hydrogen carbonates and carbonates of alkali and alkaline earth metals, as well as hydrides and amides of alkali metals. Tertiary amines and alkanolates can be used as organic bases, e.g. trialkylamines such as triethylamine, trimethylamine, pyridine and pyridine bases, as well as alkali alkanolates of lower alkanols, such as, e.g. sodium methylate, sodium ethylate, potassium ethylate, etc..

The imidazolidinetrionecarboxylic acid esters of formula Ia can also be produced by cyclisation of an allophanic acid ester of formula VI:

(VI)

with an oxalyl halide such as oxalyl chloride or oxalyl bromide, and, if $R_1$ represents hydrogen, further reaction of the formed compound of the formula:

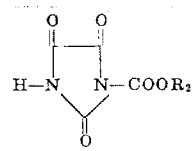

with a halide of the formula $R_1$-halogen ($R_1 \ne$ H) to obtain the desired final product. The reaction is carried out in an inert solvent as mentioned above, or also in dimethylformamide.

Allophanic esters of formula VI can be produced by known methods, e.g. by reaction of a chloroformyl urethane $R_2OOC$—NH—CO—Cl with an amine $R_1$—$NH_2$ (Am. Chem. J. 19, 344) or, if $R_1$ represents an optionally substituted phenyl radical, by reaction of a chloroformanilide with a carbamic acid ester $H_2N$-$COOR_2$ (Am. Chem. J. 19, 346). It is also possible to allow an isocyanate $R_1$—N=C=O to react with a carbamic acid ester $H_2N$—$COOR_2$, or with its alkali salt (J. Am. Chem. Soc. 41, 1008). Allophanic acid esters of formula VI can also be obtained by transamidation of an allophanic acid ester of the formula $H_2N$—CO—NH—$COOR_2$ at ca. 120° - 125°C with an amine, preferably with an aniline of the formula $R_1$—$NH_2$ (J. Am. Chem. Soc. 42, 2304). The reaction of a phenylurea of the formula $R_1$—NH—$CONH_2$ with carbonic acid dialkyl ester in a basic medium, e.g. in the presence of an alkali alcoholate, is, in some cases, advantageously applied (DRP. 427,417).

The imidazolidine derivatives of formula I wherein the substituents denoted by $R_1$ contain an amino group capable of addition salt formation can be converted by reaction with inorganic or organic acids, in a manner known per se, into the corresponding addition salts. The following acids are, for example, suitable for addition salt formation: hydrohalic acids such as hydrochloric and hydrobromic acid, also phosphoric acid, sulphuric acid, fluoroboric acid (HBF$_4$), perchloric acid, alkylsulphuric acids such as methyl- or ethylsulphuric acid, naphthoic acids, benzoic acid, halogenobenzoic acids, acetic acid, halogenoacetic acids such as trichloroacetic acid, aminoacetic acid, propionic acid, halogenopropionic acids, butyric acid, maleic acid, stearic acid, aliphatic dicarboxylic acids such as oxalic acid, tartaric acid, maleic acid.

The following examples illustrate the process according to the invention. Further imidazolidine-3-carboxylic acid derivatives of formula I which can be produced by the process described in the examples are listed in the following table. The temperatures are expressed in degrees Centigrade.

EXAMPLE 1 a. An amount of 88.1 g of ethylurea is suspended in one litre of tetrahydrofuran. An addition is slowly made at 10° of 85.2 ml of oxalyl chloride; stirring is continued for 3 hours at room temperature, and subsequently for 3 hours with refluxing. The suspension is filtered hot, the filtrate concentrated by evaporation, and the residue recrystallised from isopropanol. 1-Ethyl-2,4,5-trioxoimidazolidine is obtained, which melts at 124° – 126°.

b. An amount of 11.5 g (0.5 mole) of sodium is reacted in 200 ml of abs. ethanol to give sodium alcoholate. An addition is made at room temperature of 44.05 g (0.5 mole) of ethylurea, and stirring is continued until a clear solution is obtained. Whilst stirring is maintained, an addition is slowly made dropwise, without external cooling, of 73.01 g (0.5 mole) of oxalic acid diethyl ester, the procedure being carried out in such a manner that the reaction temperature is between 25° and 30°C, with an addition time of ca. 1.5 hours. The mixture rapidly becomes cloudy. After completion of the addition, stirring is subsequently continued for 1 hour at room temperature, and an amount of 55 ml of conc. HCl slowly added dropwise so that the reaction temperature does not exceed 30°C. After a further 1 hour's stirring, the mixture is filtered and the filtrate concentrated by evaporation until a thick pasty mass is obtained; this is filtered off under suction, dried at 70°C, and the obtained 1-ethyl-2,4,5-trioxoimidazolidine recrystallised from isopropanol.

c. An amount of 426 g of 1-ethyl-2,4,5-trioxoimidazolidine is suspended in 2.5 litres of methylene chloride. An addition is made dropwise at 15°, with cooling, of 419 ml of triethylamine, and subsequently at 5° – 10° of 390 ml of chloroformic acid isobutyl ester. Stirring is continued over night at room temperature, and the mixture then extracted three times with 500 ml of water each time. The organic phase is dried over magnesium sulphate, concentrated by evaporation, and the residue recrystallised from isopropanol. The obtained 1-ethyl-2,4,5-trioxoimidazolidine-3-carboxylic acid isobutyl ester melts at 92° – 92.5°.

d. A solution of 11.7 g of carbamic acid isobutyl ester in 20 ml of absolute toluene is slowly added, at −10° to 0° to 3.64 g of a 55 percent sodium hydride dispersion in 50 ml of absolute toluene. Stirring is continued for a further half hour, and an addition then made dropwise at −10° to + 10° of 7.9 ml of ethylisocyanate. Stirring proceeds overnight at room temperature, and the mixture is then acidified with 55 ml of ice-cold 2-n hydrochloric acid. The organic phase is washed with water until chlorine-free, dried over magnesium sulphate, and concentrated by evaporation. The oily residue of $H_5C_2-NH-CO-NH-COOisoC_4H_9$ is taken up in 100 ml of chloroform; an addition is made to the solution of 6.82 ml of oxalyl chloride, and stirring continued for two hours at room temperature and for one hour with refluxing. The chloroform is then evaporated off, and the residue recrystallised from isopropanol. The obtained 1-ethyl-2,4,5-trioxoimidazolidine-3-carboxylic acid isobutyl ester has the melting point 91° –93°.

EXAMPLE 2

An amount of 20.8 g (= 0.1 mole) of N′-phenylallophanic acid ethyl ester (= 3-phenylurea-1-carboxylic acid ethyl ester), produced according to Example 1 (d) from phenylisocyanate and carbamic acid ethyl ester in a basic medium, is placed into 200 ml of chloroform. An addition is made dropwise, with slight ice-water cooling, of 8.55 ml (= 0.1 mole) of oxalyl chloride, and, after completion of the dropwise addition, the whole refluxed for 5 hours. The reaction mixture is then cooled in an ice bath to effect the precipitation, from the clear solution, of white crystalline 1-phenyl-2,4,5-trioxoimidazolidine-3-carboxylic acid ethyl ester. The final product, including the additional amount obtained from the mother liquor, is recrystallised from isopropanol; M.P. 162° – 164°.

EXAMPLE 3 a. An amount of 250.05 g (= 1.9 moles) of allophanic acid ethyl ester, obtained by reaction of cyanamide-disodium salt with chloroformic acid ethyl ester, and saponification of the formed $NC-NH-COOC_2H_5$ with conc. sulphuric acid at ca. −10°C, is suspended in 2850 ml of benzene, and the suspension heated to 55°C. An addition is then made dropwise, in the course of 2 hours, of 162.5 ml (= 1.9 moles) of oxalyl chloride; heating is continued for a further 2 hours at 60°C, and the reaction mixture is allowed to fully react during 3 hours of refluxing; it is subsequently cooled and an amount of 318.4 g of imidazolidine-2,4,5-trione-3-carboxylic acid ethyl ester obtained; M.P. ca. 110°C.

b. An amount of 20.9 ml (=0.15 mole) of triethylamine is added dropwise to a clear solution of 27.9 g (= 0.15 mole) of imidazolidine-2,4,5-trione-3-carboxylic acid ethyl ester in 60 ml of dimethyl formamide (absolute); stirring is carried out for 15 minutes, and a dropwise addition then made rapidly of 11.3 ml (= 0.15 mole) of freshly distilled propargyl bromide; the temperature rises to ca. 60°C. Stirring is continued overnight; the solvent is then evaporated off in vacuo, the residue taken up in 250 ml of methylene chloride and washed 3 times with 50 ml of water each time. The separated methylene chloride phase is dried over $M_gSO_4$, and concentrated by evaporation to obtain 8.5 g of 1-propargyl-imidazolidine-2,4,5-trione-3-carboxylic acid ethyl ester; melting point 138° – 142°C (ethanol).

Listed in the following table are further compounds of formula Ia:

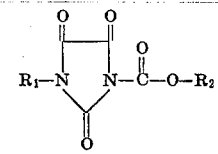

(Ia)

which are produced by the processes described in the preceding examples.

| Comp. No. | R₁ | R₂ | Melting point |
|---|---|---|---|
| 1.1 | H | Ethyl | 110°(decomp.) |
| 1.2 | Methyl | Methyl | 144° – 146° |
| 1.3 | Methyl | Ethyl | 87° – 88° |
| 1.4 | Methyl | 2-Bromoethyl | 110° – 115° |
| 1.5 | Methyl | 2-Chloroethyl | 94° |
| 1.6 | Methyl | Allyl | 76° – 78° |
| 1.7 | Methyl | Isopropyl | 68° – 71° |
| 1.8 | Methyl | n-Pentyl | 64° |
| 1.9 | Methyl | n-Butyl | 65° – 67° |
| 1.10 | Methyl | Isobutyl | 98° – 99° |
| 1.11 | Methyl | n-dodecyl | 96° – 97° |
| 1.12 | Methyl | Phenyl | 195° (decomp.) |
| 1.13 | Methyl | n-Propyl | 74° – 75° |
| 1.14 | Methyl | Benzyl | 125° – 128° |
| 1.15 | Methyl | 4-Nitrobenzyl | 187° (decomp.) |
| 1.16 | Ethyl | 2-Chloroethyl | 106° – 108° |
| 1.17 | Ethyl | Methyl | 102° – 104° |
| 1.18 | Ethyl | n-Amyl | 65° – 68° |
| 1.19 | Ethyl | Ethyl | 87° – 88° |
| 1.20 | Ethyl | n-Propyl | 76° – 77° |
| 1.21 | Ethyl | 2-Bromo | 135° – 135,5° |
| 1.22 | Ethyl | n-Octadecyl | 89° – 91° |
| 1.23 | Ethyl | Allyl | 81° – 82° |
| 1.24 | Ethyl | Propargyl | 114° – 115° |
| 1.25 | Ethyl | Isopropyl | 100° – 101,5° |
| 1.26 | Ethyl | 2-Allyloxyethyl | 55° – 57° |
| 1.27 | Ethyl | n-Butyl | 68° – 69° |
| 1.28 | Ethyl | n-Dodecyl | 87° – 89° |
| 1.29 | Ethyl | Phenyl | 172° – 176° |
| 1.30 | Ethyl | Cyclohexyl | 101° – 103° |
| 1.31 | Ethyl | Benzyl | 117° – 118° |
| 1.32 | Ethyl | Tetrahydrofurfuryl | oil |
| 1.33 | Phenyl | Methyl | 186° – 190° |
| 1.34 | Ethyl | Isobutyl | 92° – 92,5° |
| 1.35 | Ethyl | p-Tolyl | 152° – 156° |
| 1.36 | Ethyl | sec.Butyl | 72° – 73° |
| 1.37 | Phenyl | Ethyl | 163° – 165° |
| 1.38 | Phenyl | 2-Bromo | 198° (decomp.) |
| 1.39 | Phenyl | Allyl | 170° (decomp.) |
| 1.40 | Phenyl | Isopropyl | 184° – 186° |
| 1.41 | Phenyl | n-Butyl | 159° – 161° |
| 1.42 | Phenyl | Isobutyl | 162° – 164° |
| 1.43 | Phenyl | n-Pentyl | 143° – 146° |
| 1.44 | Phenyl | n-Dodecyl | 145° – 150° |
| 1.45 | Phenyl | Phenyl | 221° – 224° |
| 1.46 | Phenyl | Benzyl | 202° – 205° |
| 1.47 | Ethyl | 2-Chlorophenyl | semicryst. |
| 1.48 | n-Propyl | n-Octadecyl | 91° – 93° |
| 1.49 | n-Propyl | Propargyl | 107° – 108° |
| 1.50 | n-Propyl | Isobutyl | 85° – 88° |
| 1.51 | Isopropyl | Isobutyl | 99° – 102° |
| 1.52 | n-Butyl | Methyl | 102° – 103° |
| 1.53 | n-Butyl | 2-Allyloxyethyl | 75° – 76° |
| 1.54 | n-Butyl | Isobutyl | 85° – 87° |
| 1.55 | Isobutyl | n-Pentyl | 77° – 80° |
| 1.56 | Isobutyl | Isobutyl | 98° – 101° |
| 1.57 | 2-Ethylthioethyl | Propargyl | 108,5° – 109° |
| 1.58 | 2-Ethylthioethyl | Isobutyl | 115° – 116° |
| 1.59 | tert-Butyl | Isobutyl | 62° – 66° |
| 1.60 | Isopentyl | Isopropyl | 70° – 74° |
| 1.61 | Methyl | sec.Butyl | 94° – 96° |
| 1.62 | n-Octyl | Methyl | 111° – 112° |
| 1.63 | n-Octyl | Isobutyl | 83° – 85° |
| 1.64 | n-Dodecyl | Allyl | 99° – 100° |
| 1.65 | n-Dodecyl | Isobutyl | 87° – 90° |
| 1.66 | n-Docecyl | p-Tolyl | 149° – 152° |
| 1.67 | n-Octadecyl | Ethyl | 98° – 99° |
| 1.68 | n-Octadecyl | 2-Chlorophenyl | 76° – 78° |
| 1.69 | Allyl | Isobutyl | 79,5° – 82° |
| 1.70 | Propargyl | Ethyl | 138° – 142° |
| 1.71 | 2-Chloroethyl | Ethyl | 128° – 130° |
| 1.72 | sec.Butyl | Isobutyl | 32° – 36° |
| 1.73 | Isobutyl | Tetrahydrofurfuryl | 88° – 91° |
| 1.74 | 2-Methoxyethyl | Isobutyl | 38° – 42° |
| 1.75 | 2-Dimethylaminoethyl | Allyl | 43° – 46° |
| 1.76 | Cyclopropyl | Isobutyl | 135° – 135,5° |
| 1.77 | Cyclopropyl | n-Octadecyl | 113° – 115° |
| 1.78 | Cyclopropyl | p-Tolyl | 197° – 200° |
| 1.79 | Cyclopentyl | Methyl | 105° – 106° |
| 1.80 | Cyclopentyl | Isobutyl | 117° – 119° |
| 1.81 | Cyclohexyl | Isopropyl | 128° – 130° |
| 1.82 | Cyclohexyl | Isobutyl | 130° – 132° |
| 1.83 | Cyclododecyl | Isobutyl | 104° – 109° |
| 1.84 | Cyclododecyl | Benzyl | 122° – 128° |
| 1.85 | 4-Cyclohexylbutyl | Tetrahydrofurfuryl | 77° – 79° |
| 1.86 | 4-Cyclohexylbutyl | Isobutyl | 112° – 113° |
| 1.87 | 3-Bromophenyl | Isopropyl | 105° – 108° |
| 1.88 | 3-Bromophenyl | Cyclohexyl | 172° – 175° |
| 1.89 | p-Tolyl | n-pentyl | 136° – 140° |
| 1.90 | p-Tolyl | 2-Allyloxyethyl | 136° – 139° |
| 1.91 | 3-Trifluoromethyl | Methyl | 180° – 183° |

| Comp. No. | R₁ | R₂ | Melting point |
|---|---|---|---|
| 1.92 | 2,5-Dimethoxyphenyl phenyl | Isobutyl | 116° – 118° |
| 1.93 | 2,5-Dimethoxyphenyl | Propargyl | 130° – 132° |
| 1.94 | Benzyl | Ethyl | 108,5° – 110° |
| 1.95 | Benzyl | Isobutyl | 126° – 127° |
| 1.96 | Benzyl | 3-Chlorophenyl | 167° – 170° |
| 1.97 | 4-Chlorobenzyl | n-Octadecyl | 108° – 110° |
| 1.98 | 4-Chlorobenzyl | p-Tolyl | 172° – 173° |
| 1.99 | Tetrahydrofurfuryl | Isobutyl | 78° – 81° |
| 1.100 | Tetrahydro-3-thienyl-s,s-dioxide | Ethyl | 157° – 160° |
| 1.101 | Tetrahydro-3-thienyl-s,s-dioxide | Isobutyl | 123° – 127° |
| 1.102 | Tetrahydro-3-thienyl-s,s-dioxide | Benzyl | 169° – 172° |
| 1.103 | —CH₂COOCH₂CH₃ | Ethyl | semicryst. |
| 1.104 | H | Isobutyl | 122° – 125° |
| 1.105 | 2-Methoxyethyl | 2-Chlorophenyl | semicryst. |
| 1.106 | 2-Methoxyphenyl | Isobutyl | 144° – 146° |
| 1.107 | Ethoxycarbonyl | Benzyl | semicryst. |
| 1.108 | Ethylthiocarbonyl | Ethyl | semicryst. |
| 1.109 | Methoxycarbonyl | Ethyl | semicryst. |
| 1.110 | Ethoxycarbonyl | n-Octadecyl | ca. 90° |
| 1.111 | Isobutoxycarbonyl | Ethyl | semicryst. |
| 1.112 | Benzyloxycarbonyl | Isobutyl | semicryst. |

EXAMPLE 4

An amount of 71 g of 1-ethyl-2,4,5-trioxoimidazolidine is suspended in 500 ml of methylene chloride. Additions are made dropwise, with cooling, firstly of 70 ml of triethylamine at 15°, and subsequently of 62.5 g of chlorothioformic acid-S-ethyl ester at room temperature, the reaction temperature rising during this stage into the boiling range of the solvent. The reaction is completed by 10 hours of refluxing. After cooling of the reaction solution to room temperature, it is extracted by being shaken three times with 100 ml of water each time. The organic phase is dried over magnesium sulphate, concentrated by evaporation, and the residue recrystallised from isopropanol. The obtained 1-ethyl-2,4,5-trioxoimidazolidine-3-thiocarboxylic acid-S-ethyl ester melts at 123° –124°, with decomposition.

EXAMPLE 5 a. An amount of 272.3 g of N-phenylurea is dissolved in 1.5 litres of tetrahydrofuran. The solution is heated to 50°, and an addition slowly made of 171 ml of oxalyl chloride, the reaction temperature not having to exceed 65°. Stirring is continued for one hour at room temperature, and afterwards for four hours during refluxing. The reaction mixture is concentrated by evaporation and the residue recrystallised from isopropanol. 1-Phenyl-3,4,5-trioxoimidazolidine is obtained, which melts at 214°–216°.

b. An amount of 19 g of 1-phenyl-2,4,5-trioxoimidazolidine is suspended in 100 ml of chloroform. Additions are made dropwise, with cooling, firstly of 14 ml of triethylamine at 15°, and secondly of 15.3 g of chlorothioformic acid-S-sec.butyl ester at room temperature. Stirring is carried out for 8 hours with refluxing. After cooling to room temperature, the reaction mixture is extracted three times with 30 ml of water each time. The organic phase is dried over magnesium sulphate, concentrated by evaporation, and the residue recrystallised from isopropanol. The obtained 1-phenyl-2,4,5-trioxoimidazolidine-3-thiocarboxylic acid-S-sec.butyl ester melts at 150°–152°.

Listed in the following table are further compounds of formula Ib:

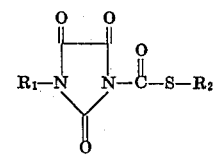

(Ib)

which are produced by the processes described in the preceding Examples 4 and 5:

| Comp. No. | R₁ | R₂ | Melting point |
|---|---|---|---|
| 2.1 | Methyl | Ethyl | 105° – 107° |
| 2.2 | Methyl | Allyl | 113° – 115° |
| 2.3 | Methyl | n-Propyl | 109° – 110° |
| 2.4 | Methyl | Isopropyl | 95° – 98° |
| 2.5 | Methyl | n-Butyl | 74° – 79° |
| 2.6 | Methyl | sec.Butyl | 95° – 97° |
| 2.7 | Methyl | tert.Butyl | 112° – 113° |
| 2.8 | Ethyl | Ethyl | 123° – 124° |
| 2.9 | Ethyl | Allyl | 119° – 121° |
| 2.10 | Ethyl | n-Propyl | 100° – 102° |
| 2.11 | Ethyl | Isopropyl | 99° – 101° |
| 2.12 | Ethyl | n-Butyl | 70° – 74° |
| 2.13 | Ethyl | sec-Butyl | 72° – 74° |
| 2.14 | Ethyl | tert.-Butyl | 91° – 93° |
| 2.15 | Phenyl | Ethyl | 138°(decomp.) |
| 2.16 | Phenyl | Allyl | 189° – 190° |
| 2.17 | Phenyl | n-Propyl | 148°(decomp.) |
| 2.18 | Phenyl | Isopropyl | 147°(decomp.) |
| 2.19 | Phenyl | sec.-Butyl | 150° – 152° |
| 2.20 | Phenyl | n-Butyl | 162°(decomp.) |
| 2.21 | Cyclopropyl | Cyclohexyl | 155° – 156° |

| Comp. No. | R₁ | R₂ | Melting point |
|---|---|---|---|
| 2.22 | 4-Cyclohexylbutyl | Isobutyl | 83,5° – 86° |
| 2.23 | Methyl | Methyl | 127° – 129° |
| 2.24 | n-Butyl | Isobutyl | 43° – 45° |
| 2.25 | Isopropyl | Furfuryl | 106° – 108° |
| 2.26 | Allyl | Methoxyethoxy carbonylmethyl | semicryst. |
| 2.27 | n-Propyl | sec.-Butyl | 74° – 77° |
| 2.28 | Isobutyl | Isobutyl | 82° – 85° |
| 2.29 | Ethyl | 1-Phenethyl | semicryst. |
| 2.30 | Allyl | p-Chlorobenzyl | 220° – 225° |
| 2.31 | Allyl | t-Butyl | semicryst. |
| 2.32 | Benzyl | 2,4,4-Trimethyl-pentyl | semicryst. |
| 2.33 | Isobutoxycarbonyl | Ethyl | semicryst. |
| 2.34 | Isobutoxycarbonyl | Methyl | semicryst. |
| 2.35 | Ethoxycarbonyl | Isobutyl | semicryst. |
| 2.36 | Ethyl | Isoamyl | 76° – 79° |
| 2.37 | 2-Methoxyphenyl | Cyclohexyl | 189° – 192° |
| 2.38 | Ethyl | 2,2-Dimethyl-propyl | semicryst. |
| 2.39 | sec.Butyl | 2,4,4-Trimethyl-pentyl | semicryst. |
| 2.40 | Methyl | n-Octadecyl | 120° – 122° |
| 2.41 | sec.Butyl | 2-Methoxyethyl | semicryst. |
| 2.42 | n-Octadecyl | n-Octadecyl | 111° – 113° |
| 2.43 | 3-Nitro-4-tolyl | Isopropyl | 138° – 140° |

Listed in the following table are new 2,4,5-trioxoimidazolidine derivatives of formula III:

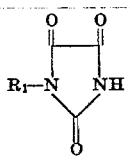

| R₁ | Melting point |
|---|---|
| n-Propyl | 109° – 112° |
| Isopropyl | 95° – 97° |
| n-Butyl | 96,5° – 99° |
| tert-Butyl | 119° – 126° |
| n-Octyl | 105° – 107° |
| n-Dodecyl | 112° – 115° |
| 2-Chloroethyl | 119° – 121° |
| 2-Methoxyphenyl | 171° – 173° |
| 2-Methoxyethyl | 107° – 108° |
| 2-Dimethylaminoethyl·HCl | 230° – 235° |
| Cyclopropyl | 155° – 158° |
| Cyclopentyl | 107° – 110° |
| Cyclododecyl | ca 153° |
| 4-Cyclohexylbutyl | 86,5° – 91° |
| 4-Chlorobenzyl | 175° – 176° |
| 3-Bromophenyl | 235° – 237° |
| 3-Trifluormethyl-phenyl | 180° – 182° |
| 2,5-Dimethoxy-phenyl | 192° – 197° |
| 2-Ethylthioethyl | 88° – 90° |
| Sulpholane | 235° – 240° |
| 4-Chlorophenyl | 235° |
| 3,4-Dichlorophenyl | 231° – 232° |
| Tetrahydrofurfuryl | 94° – 96° |
| sec.Butyl | semicryst. |
| 3,5-Dichlorophenyl | 215° – 217° |
| 3-Nitro-4-methylphenyl | 192° – 195° |

The active substances of formula I and their salts affect in a varying manner the growth of parts of plants above and below the soil; in the usual applied concentrations the said active substances and their salts are not phytotoxic, and have low toxicity towards warm-blooded animals. The active substances produce no morphological changes or damage that would result in the withering of the plant. Their effect differs from that of a herbicidal active substance and of a fertiliser.

The new compounds affect the vegetative plant growth and the formation of abscission layers; fruit abscission is, in consequence of this, appreciably facilitated, a factor which has great economic significance for the mechanical harvesting, e.g. of citrus fruits, apples, pears, peaches, cherries, and of other stone fruit or pomaceous fruits, as well as of olives.

The following test shows to what degree the abscission of citrus fruits is promoted.

EXAMPLE 6

On citrus trees of the given varieties, individual branches which were carrying at least 15 – 20 ripe fruit were sprayed with a concentration of active substance of 0.4 percent or 0.2 percent. The picking force required in the case of 10 identically treated fruits was determined with the aid of a spring balance 7 days after the said application, and the mean value from the 10 measured values calculated [W. C. Wilson and C. H. Hendershott, Proc. Am. Soc. Hort. Science 90, 123–129 (1967)].

The active substances of formula I produced in this test the reductions in the required picking force which are listed in the following table. Three different varieties of orange were used in the test:

1 = Valencia, tested in Florida,
2 = Pine apple, tested in Florida,
3 = Navel, tested in Spain.

| Active substance | Concentration % | Force in kg | Variety |
|---|---|---|---|
| 1-methyl-2,4,5-trioxoimidazolidine-3-carboxylic acid-n-butyl ester | 0.2 | 3.1 | 2 |
|  | 0.4 | * |  |
| 1-methyl-2,4,5-trioxoimidazolidine-3-carboxylic acid-isobutyl ester | 0.2 | 2.6 | 2 |
|  | 0.4 | * |  |
| 1-ethyl-2,4,5-trioxoimidazolidine-3-carboxylic acid-isobutyl ester | 0.2 | * | 1 |
|  | 0.4 | * |  |
| 1-ethyl-2,4,5-trioxoimidazolidine-3-carboxylic acid-benzyl ester | 0.4 | 4.1 | 2 |
| 1-methyl-2,4,5-trioxoimidazolidine 3-carboxylic acid-methyl ester | 0.2 | 6.1 | 1 |
|  | 0.4 | 5.7 |  |
| 1-methyl-2,4,5-trioxoimidazolidine-3-carboxylic acid-ethyl ester | 0.2 | 2.3 | 2 |
|  | 0.4 | * |  |

| Active substance | Concentration % | Force in kg | Variety |
|---|---|---|---|
| 1-methyl-2,4,5-trioxoimidazolidine-3-carboxylic acid-(2'-bromoethyl)ester | 0.4 | 3.8 | 1 |
| 1-methyl-2,4,5-trioxoimidazolidine-3-carboxylic acid-allyl ester | 0.4 | 2.5 | 2 |
| 1-methyl-2,4,5-trioxoimidazolidine-3-carboxylic acid-isopropyl ester | 0.2 | * | 1 |
|  | 0.4 | * |  |
| 1-methyl-2,4,5-trioxoimidazolidine-3-carboxylic acid-(4'-nitrobenzyl)-ester | 0.2 | 5.4 | 1 |
| 1-ethyl-2,4,5-trioxoimidazolidine-3-carboxylic acid-methyl ester | 0.2 | 6.1 | 1 |
|  | 0.4 | * |  |
| 1-ethyl-2,4,5-trioxoimidazolidine-3-carboxylic acid-ethyl ester | 0.2 | 3.0 | 1 |
|  | 0.4 | * |  |
| 1-ethyl-2,4,5-trioxoimidazolidine-3-carboxylic acid-(2'-bromoethyl)ester | 0.2 | 7.1 | 1 |
|  | 0.4 | 5.8 |  |
| 1-ethyl-2,4,5-trioxoimidazolidine-3-carboxylic acid-allyl ester | 0.2 | 6.8 | 1 |
|  | 0.4 | 4.4 |  |
| 1-ethyl-2,4,5-trioxoimidazolidine-3-carboxylic acid-isopropyl ester | 0.2 | 7.9 | 1 |
|  | 0.4 | 7.4 |  |
| 1-ethyl-2,4,5-trioxoimidazolidine-3-carboxylic acid-n-butyl ester | 0.2 | 1.2 | 2 |
|  | 0.4 | * |  |
| 1-ethyl-2,4,5-trioxoimidazolidine-3-carboxylic acid-phenyl ester | 0.2 | 7.0 | 1 |
|  | 0.4 | 6.2 |  |
| 1-ethyl-2,4,5-trioxoimidazolidine-3-carboxylic acid-(2'-chloroethyl)ester | 0.4 | 6.4 | 3 |
| 1-phenyl-2,4,5-trioxoimidazolidine-3-carboxylic acid-n-butyl ester | 0.2 | 7.1 | 1 |
|  | 0.4 | 6.0 |  |
| 1-phenyl-2,4,5-trioxoimidazolidine-3-carboxylic acid-isobutyl ester | 0.2 | 7.5 | 1 |
|  | 0.4 | 7.4 |  |
| 1-phenyl-2,4,5-trioxoimidazolidine-3-carboxylic acid benzyl ester | 0.4 | 6.8 | 1 |
| 1-n-propyl-2,4,5-trioxoimidazolidine-3-carboxylic acid-isopropyl ester | 0.4 | 5.0 | 3 |
| 1-n-butyl-2,4,5-trioxoimidazolidine-3-carboxylic acid-methyl ester | 0.4 | 7.0 | 3 |
| 1-n-butyl-2,4,5-trioxoimidazolidine-3-carboxylic acid-(2'-allyloxyethyl)ester | 0.4 | 6.8 | 3 |
| 1-n-butyl-2,4,5-trioxoimidazolidine-3-carboxylic acid-isobutyl ester | 0.4 | 6.6 | 3 |
| 1-isobutyl-2,4,5-trioxoimidazolidine-3-carboxylic acid-isobutyl ester | 0.4 | 5.7 | 3 |
| 1-n-octyl-2,4,5-trioxoimidazolidine-3-carboxylic acid-methyl ester | 0.4 | 6.9 | 3 |
| 1-n-octyl-2,4,5-trioxoimidazolidine-3-carboxylic acid isobutyl ester | 0.4 | 6.8 | 3 |
| 1-(2'-chloroethyl)-2,4,5-trioxoimidazolidine 3-carboxylic acid-ethyl ester | 0.4 | 7.0 | 3 |
| 1-isobutyl-2,4,5-trioxoimidazolidine-3-carboxylic acid-tetrahydrofurfuryl ester | 0.4 | 6.3 | 3 |
| 1-benzyl-2,4,5-trioxo-imidazolidine-3-carboxylic acid-isobutyl ester | 0.4 | 5.8 | 3 |
| 1-methyl-2,4,5-trioxo-imidazolidine-3-thiocarboxylic acid-S-ethyl ester | 0.2 | 7.6 | 1 |
|  | 0.4 | * |  |
| 1-methyl-2,4,5-trioxo-imidazolidine-3-thiocarboxylic acid-S-n-propyl ester | 0.2 | 4.0 | 1 |
|  | 0.4 | * |  |
| 1-ethyl-2,4,5-trioxo-imidazolidine-3-thiocarboxylic acid-S-n-propyl ester | 0.2 | 4.2 | 1 |
|  | 0.4 | * |  |
| 1-phenyl-2,4,5-trioxoimidazolidine-3-thiocarboxylic acid-S-n-propyl ester | 0.4 | 6.6 | 1 |
| 1-phenyl-2,4,5-trioxoimidazolidine-3-thiocarboxylic acid-S-ethyl ester | 0.4 | 6.6 | 1 |
| 1-methyl-2,4,5-trioxoimidazolidine-3-thiocarboxylic acid-S-n-butyl ester | 0.2 | * | 1 |
|  | 0.4 | * |  |
| 1-ethyl-2,4,5-trioxoimidazolidine-3-thiocarboxylic acid-S-n-butyl ester | 0.2 | * | 1 |
|  | 0.4 | * |  |
| 1-ethyl-2,4,5-trioxoimidazolidine-3-thiocarboxylic acid-S-isopropyl ester | 0.2 | * | 1 |
|  | 0.4 | * |  |
| 1-methyl-2,4,5-trioxoimidazolidine-3-thiocarboxylic acid-S-isopropyl ester | 0.2 | * | 1 |
|  | 0.4 | * |  |
| 1-phenyl-2,4,5-trioxoimidazolidine-3-thiocarboxylic acid-S-n-butyl ester | 0.2 | 7.2 | 1 |
|  | 0.4 | 6.7 |  |
| 1-ethyl-2,4,5-trioxoimidazolidine-3-thiocarboxylic acid-S-ethyl ester | 0.2 | 4.9 | 1 |
|  | 0.4 | * |  |
| 1-methyl-2,4,5-trioxoimidazolidine-3-thiocarboxylic acid-S-allyl ester | 0.2 | 6.1 | 1 |
|  | 0.4 | * |  |
| 1-ethyl-2,4,5-trioxoimidazolidine-3-thiocarboxylic acid-S-allyl ester | 0.2 | * | 1 |
|  | 0.4 | * |  |
| 1-phenyl-2,4,5-trioxoimidazolidine-3-thiocarboxylic acid-S-allyl ester | 0.2 | 7.1 | 1 |
|  | 0.4 | 6.6 |  |
| 1-methyl-2,4,5-trioxoimidazolidine-3-thiocarboxylic acid-S-sec.butyl ester | 0.2 | * | 1 |
|  | 0.4 | * |  |
| 1-ethyl-2,4,5-trioxoimidazolidine-3-thiocarboxylic acid-S-sec.butyl ester | 0.2 | * | 1 |
|  | 0.4 | * |  |
| 1-methyl-2,4,5-trioxoimidazolidine-3-thiocarboxylic acid-S-tert.butyl ester | 0.2 | * | 1 |
|  | 0.4 | * |  |
| 1-ethyl-2,4,5-trioxoimidazolidine-3-thiocarboxylic acid-S-tert.butyl ester | 0.2 | * | 1 |
|  | 0.4 | * |  |
| control | — | 8.5 | 1 |

*The fruit hanging on the tree were so easy to remove that no measurement was possible.

EXAMPLE 7

Tests to Determine Inhibition of Senescence a. Preserving of Cut Flowers

Roses of the variety Dr. Verhagen (imported from Holland) were used as test flowers. They were placed into the corresponding test solutions and then kept in a controlled atmosphere chamber at constant temperature (co. 25°C) and with a relative humidity of ca. 80 percent. The condition of the roses was assessed daily. The values given in the table represent the number of days the blooms remained in good condition, without them losing petals or displaying clear signs of wilting.

The active substances were not tested direct in water but in a base solution buffered to a pH-value of 3.4, which contained, e.g. a fungicide such as "Irgasan".

Three roses were in one container in each case and three containers in each case contained the same solution. The value representing the keeping quality in the base solution without active substance is given as a comparison. The active substances, made up as wettable powders, were added, as a rule, in a concentration of 50 ppm.

| Active substance | Conc. ppm | Preservation in days |
|---|---|---|
| 1-methyl-2,4,5-trioxoimidazolidine-3-thiocarboxylic acid-S-n-propyl ester | 50 | 7 |
| 1-methyl-2,4,5-trioxoimidazolidine-3-thiocarboxylic acid-S-isopropyl ester | 50 | 9 |
| 1-methyl-2,4,5-trioxoimidazolidine-3-thiocarboxylic acid-S-sec.-butyl ester | 50 | 9 |
| 1-methyl-2,4,5-trioxoimidazolidine-3-thiocarboxylic acid-S-tert-butyl ester | 50 | 4 |
| 1-ethyl-2,4,5-trioxoimidazolidine-3-thiocarboxylic acid-S-ethyl ester | 50 | 7 |
| 1-ethyl-2,4,5-trioxoimidazolidine-3-thiocarboxylic acid-S-allyl ester | 50 | 7.5 |
| 1-ethyl-2,4,5-trioxoimidazolidine-3-thiocarboxylic acid-S-n-butyl ester | 50 | 7.5 |
| 1-ethyl-2,4,5-trioxoimidazolidine-3-thiocarboxylic acid-S-sec.-butyl ester | 50 | 4 |
| 1-ethyl-2,4,5-trioxoimidazolidine-3-thiocarboxylic acid-S-tert.-butyl ester | 50 | 6 |
| 1-phenyl-2,4,5-trioxoimidazolidine-3-thiocarboxylic acid-S-ethyl ester | 50 | 6.5 |
| 1-phenyl-2,4,5-trioxoimidazolidine-3-thiocarboxylic acid-S-n-propyl ester | 50 | 9 |
| 1-phenyl-2,4,5-trioxoimidazolidine-3-thiocarboxylic acid-S-isopropyl ester | 50 | 5 |
| 1-phenyl-2,4,5-trioxoimidazolidine-3-thiocarboxylic acid-S-allyl ester | 50 | 7 |
| 1-phenyl-2,4,5-trioxoimidazolidine-3-thiocarboxylic acid-S-n-butyl ester | — | 3 |
| Control: $H_2O$ (pH 3.4 + fungicide) | | | b. Preserving of Cut Sinapis Shoots

Mustard plants (Sinapis alba) are grown in plastic dishes with compost soil at 22°C, and with the action of light for 16 hours daily (= ca. 5,000 lux). For the preserving test, freshly cut shoots 12 – 15 cm in length are used taken from 4 week old plants having green leaf buds. The shoots are placed separately into beakers containing graduated concentrations of active substance, obtained by the dissolving of varying amounts of a 25 percent wettable powder. The shoots are kept for 14 days in the beakers at 23°C and 70 percent relative humidity, with the action of light for 16 hours per day (= ca. 10,000 lux).

The test is carried out twice.

The following results were obtained, the graduated basis for evaluation being as follows:

Value 9 = severe yellowing of the leaves (control),
Value 1 = fresh green leaves,
D = pronounced dark-green colouration of the leaves,
I = intense green colouration,
Q = retardation of flowering The extent and the nature of the action are dependent on various factors, including the applied concentration, and the time of application with regard to the stage of development of the plant. These factors vary, however, depending on the type of plant and on the desired effect. Thus, for example, plants of which the fruit is processed or sold will be treated immediately after blossoming, or at a suitable point of time before harvesting.

The active substances are applied in the form of solid or liquid agents; they are applied to parts of plants above the soil, into the soil itself, or onto the surface of the soil. Application to parts of plants above the soil is

| Active substance | 50 ppm | 20 ppm | 10 ppm | 5 ppm |
|---|---|---|---|---|
| 1-phenyl-2,4,5-trioxoimidazolidine-3-carboxylic acid-methyl ester | 1 D | 4 D | 7 | 8 |
| 1-ethyl-2,4,5-trioxoimidazolidine-3-carboxylic acid-ethyl ester | 4 DQ | 6 I | 6 I | 4 DQ |
| 1-ethyl-2,4,5-trioxoimidazolidine-3-carboxylic acid isobutyl ester | 7 I | 7 IQ | 5 D | 5 D |
| 1-phenyl-2,4,5-trioxoimidazolidine-3-carboxylic acid-n-butyl ester | 7 I | 7 D | 6 I | 8 I |
| 1-phenyl-2,4,5-trioxoimidazolidine-3-thiocarboxylic acid-S-n-propyl ester | 1 D | 4 DQ | 6 I | 8 |
| 1-methyl-2,4,5-trioxoimidazolidine-3-thiocarboxylic acid-S-isopropyl ester | 6 DQ | 6 D | 7 I | 5 D |
| 1-methyl-2,4,5-trioxoimidazolidine-3-thiocarboxylic acid-S-sec.butyl ester | 3 DQ | 4 D | 6 D | 8 |
| 1-benzyl-2,4,5-trioxoimidazolidine-3-carboxylic acid-isobutyl ester | 6 I | 8 I | 6 DQ | 8 |
| 1-dodecyl-2,4,5-trioxoimidazolidine-3-carboxylic acid-isobutyl ester | 3 DQ | 6 I | 7 | 6 DQ | preferred, and solutions or aqueous dispersions are most suitable for this form of application. Other suitable preparations for the treatment of the nutrient substrate, besides the said solutions and dispersions, are dusts, granules and scattering agents.

Herbicidal agents according to the invention are produced in a manner known per se by the intimate mixing and grinding of active substances with suitable carriers, optionally with the addition of dispersing agents or solvents which are inert to the active substances. The active substances can be obtained and used in the following forms:

solid preparations: dusts, scattering agents, granulates, (coated granulates, impregnated granulates and homogeneous granulates);
water-dispersible concentrates of the active substance: wettable powders, pastes, emulsions;
liquid preparations: solutions.

The solid preparations (dusts, scattering agents, granulates) are produced by the mixing of the active substances with solid carriers. Suitable carriers are, e.g. kaolin, talcum, bole, loess, chalk, limestone, ground limestone, Attaclay, dolomite, diatomaceous earth, precipitated silicic acid, alkaline-earth silicates, sodium and potassium aluminium silicates (feldspar and mica), calcium and magnesium sulphates, magnesium oxide, ground synthetic materials, fertilisers such as ammonium sulphate, ammonium phosphate, ammonium nitrate, urea, ground vegetable products such as bran, bark dust, sawdust, ground nutshells, cellulose powder, residues of plant extractions, active charcoal, etc., alone or in admixture with each other.

The particle size of the carriers is for dusts advantageously up to about 0.1 mm; for scattering agents from about 0.075 mm to 0.2 mm; and for granulates 0.2 mm or coarser.

The concentrations of active substance in the solid preparation forms are from 0.5 to 80 percent.

To these mixtures may also be added additives stabilising the active substance, and/or non-ionic, anionactive, and cation-active substances, which, for example, improve the adhesiveness of the active substances on plants and on parts of plants (adhesives and agglutinants), and/or ensure a better wettability (wetting agents) and dispersibility (dispersing agents). Suitable adhesives are, for example, the following: olein/lime mixture, cellulose derivatives (methyl cellulose, carboxymethyl cellulose), hydroxyethylene glycol ethers of monoalkyl and dialkyl phenols having 5 to 15 ethylene oxide radicals per molecule and eight to nine carbon atoms in the alkyl radical, ligninsulphonic acids, their alkali metal and alkaline-earth metal salts, polyethylene glycol ethers (carbowaxes), fatty alcohol polyethylene glycol ethers having 5 to 20 ethylene oxide radicals per molecule and eight to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substance, i.e. wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents. The concentration of active substance in these agents is 5 to 80 percent.

The wettable powders and the pastes are obtained by the mixing and grinding of the active substances with dispersing agents and pulverulent carriers, in suitable devices, until homogeneity is attained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of ligninsulphonic acid, also alkylaryl sulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkalimetal and alkaline-earth metal salts.

Suitable anti-foam agents are, for example, silicones.

The active substances are so mixed, ground, sieved and strained with the above mentioned additives that the solid constituent in the case of wettable powders has a particle size not exceeding 0.02 to 0.04 mm, and in the case of pastes not exceeding 0.03 mm. For the preparation of emulsion concentrates and pastes, dispersing agents are used such as those mentioned in the preceding paragraphs, organic solvents, and water. Suitable solvents are, e.g. the following: alcohols, benzene, xylenes, toluene, dimethylsulphoxide, N,N-dialkylated amides, N-oxides of amines, particularly trialkylamines, and mineral oil fractions boiling in the range of 120° to 350°. The solvents must be practically odourless, non-phytotoxic, inert to the active substances, and not readily inflammable.

Furthermore, the agents according to the invention can be applied in the form of solutions. For this purpose the active substance (or several active substances) is (or are) dissolved in suitable organic solvents, mixtures of solvents, water, or mixtures of organic solvents with water. It is possible to use as organic solvents: aliphatic and aromatic hydrocarbons, their chlorinated derivatives, alkylnaphthalenes, mineral oils on their own or in admixture with each other. The solutions are to contain the active substances in a concentration of from 1 to 20 percent. These solutions can be applied with the aid of a propellent gas (as spray), or by means of special sprayers (such as aerosol).

Other biocidal active substances or agents may be added to the described agents according to the invention. For the widening of their sphere of action, the new agents can also contain, in addition to the stated compounds of the general formula I, e.g. insecticides, fungicides, bactericides, fungistatics, bacteriostatics or nematocides. The agenets according to the invention can also contain fertilisers, trace elements, etc..

Preparations of the new active substances are described in the following. The term 'parts' denotes parts by weight.

Granulate

The following substances are used for the preparation of a 5 percent granulate:

| | |
|---|---|
| 5 | parts of 1-ethyl-2,4,5-trioxoimidazolidine-3-thiocarboxylic acid-S-n-butyl ester, |
| 0.25 | parts of epichlorohydrin, |
| 0.25 | parts of cetyl polyglycol ether, |
| 3.50 | parts of polyethylene glycol, |
| 91 | parts of kaolin (particle size 0.3 - 0.8 mm). |

The active substance is mixed with epichlorohydrin and the mixture dissolved in 6 parts of acetone; polyethylene glycol and cetyl polyglycol ether are thereupon added. The thus obtained solution is sprayed on kaolin, and the acetone subsequently evaporated off.

Wettable Powder

The following constituents are used for the preparation of (a) a 40 percent, (b) a 50 percent, (c) a 25 percent, and (d) a 10 percent wettable powder:

| | | |
|---|---|---|
| (a) | 40 parts | of 1-ethyl-2,4,5-trioxoimidazolidine-3-carboxylic acid-methyl ester, |
| | 5 parts | of sodium lignin sulphonate, |
| | 1 part | of sodium dibutyl-naphthalene sulphonate |
| | 54 parts | of silicic acid; |
| (b) | 50 parts | of 1-methyl-2,4,5-trioxoimidazolidine-3-thiocarboxylic acid-S-tert.butyl ester, |
| | 5 parts | of alkylaryl sulphonate ("Tinovetin B"), |
| | 10 parts | of calcium lignin sulphonate, |
| | 1 part | of Champagne chalk/hydroxyethyl cellulose mixture (1:1), |
| | 20 parts | of silicic acid, |
| | 14 parts | of kaolin; |
| (c) | 25 parts | of 1-ethyl-2,4,5-trioxoimidazolidine-3-carboxylic acid-isobutyl ester, |
| | 5 parts | of the sodium salt of oleylmethyl tauride, |
| | 2.5 parts | of naphthalenesulphonic acid/formaldehyde condensate, |
| | 0.5 part | of carboxymethyl cellulose, |
| | 5 parts | of neutral potassium-aluminum silicate, |
| | 62 parts | of kaolin; |
| (d) | 10 parts | of 1-methyl-2,4,5-trioxoimidazolidine-3-thiocarboxylic acid-S-allyl ester, |
| | 3 parts | of a mixture of the sodium salts of saturated fatty alcohol sulphates, |
| | 5 parts | of naphthalenesulphonic acid/formaldehyde condensate, |
| | 82 parts | of kaolin. |

The active substances are intimately mixed, in suitable mixers, with the additives; and the mixture is then ground by means of suitable grinding mills and rollers. Wettable powders are obtained which can be diluted with water to obtain suspensions of any desired concentration.

Emulsion Concentrate

The following constituents are mixed together for the preparation of 25 percent emulsion concentrates:

| | | |
|---|---|---|
| (a) | 25 parts of | 1-ethyl-2,4,5-trioxoimidazolidine-3-thiocarboxylic acid-S-n-propyl ester, |
| | 5 parts of | a mixture of nonylphenolpolyoxyethylene and calcium-dodecylbenzenesulphonate, |
| | 70 parts of | xylene; |
| (b) | 25 parts of | 1-phenyl-2,4,5-trioxoimidazolidine-3-thiocarboxylic acid-n-butyl ester, |
| | 10 parts of | a mixture of nonylphenolpolyoxyethylene and calcium-dodecylbenzenesulphonate, |
| | 65 parts of | cyclohexanone. |

This concentrate can be diluted with water to obtain emulsions of suitable concentration. Such emulsions are suitable for the thinning of blossom and fruit, for the accelerated ripening of fruit, and for the promotion of fruit and leaf abscission.

Instead of the active substances mentioned in the production examples for granulates, wettable powders and emulsion concentrates, it is also possible to use the other compounds embraced by formula I.

We claim:

1. An imidazolidinetrione -carboxylic acid derivative of formula I:

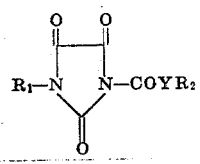

(I)

wherein $R_1$ represents hydrogen, a $C_1$–$C_{18}$ alkyl, $C_3$–$C_{18}$ alkenyl, $C_3$–$C_5$ alkinyl radical, a $C_3$–$C_{12}$ cycloalkyl radical, or an alkoxycarbonyl or alkylthio-carbonyl radical having $C_1$–$C_4$ alkyl groups, a $C_1$–$C_4$ alkyl radical substituted by $C_3$–$C_6$ cycloalkyl, $C_1$–$C_6$ alkoxy, alkoxycarbonyl having $C_1$–$C_6$ alkyl groups, alkoxyalkoxycarbonyl having $C_1$–$C_6$ alkyl groups, $C_1$–$C_6$ alkylthio, dialkylamino having $C_1$–$C_6$ alkyl groups or by halogen, an alkenyloxyalkyl radical having $C_3$–$C_4$ alkenyl groups, a phenyl radical optionally substituted by halogen, nitro, $C_1$–$C_6$ alkyl, $C_1$–$C_6$ alkoxy, or halogenalkyl having $C_1$–$C_4$ alkyl groups, the tetrahydro-3-thienyl-S,S-dioxide radical, a benzyl or phenylethyl radical optionally ring-substituted by halogen, nitro and/or $C_1$–$C_6$ alkyl, or a tetrahydrofurfuryl radical, $R_2$ represents a $C_1$–$C_{18}$ alkyl, $C_3$–$C_{18}$ alkenyl, $C_3$–$C_5$ alkinyl radical, a $C_3$–$C_{12}$ cycloaliphatic radical, or an alkyl radical substituted by $C_3$–$C_6$ cycloalkyl, alkoxyalkoxycarbonyl having $C_1$–$C_6$ alkyl groups, alkenyloxy having $C_3$–$C_4$ alkenyl groups, $C_1$–$C_6$ alkoxy, or halogen, a phenyl radical optionally substituted by halogen, nitro, $C_1$–$C_6$ alkyl, or halogenalkyl having $C_1$–$C_4$ alkyl groups, a benzyl or phenylethyl radical optionally ring-substituted by halogen, nitro and/or $C_1$–$C_6$ alkyl, or a furfuryl or tetrahydrofurfuryl radical, Y represents an oxygen or sulphur atom, and their addition salts with organic and inorganic acids.

2. An imidazolidivetrionecarboxylic acid derivative according to claim 1 wherein $R_1$ and $R_2$ independently represent an alkyl radical having up to eight carbon atoms, a chloro- or bromoalkyl radical having up to four carbon atoms, an alkoxyalkyl radical having up to five carbon atoms, an alkenyl, chloroalkenyl or bromoalkenyl radical having up to four carbon atoms, a propargyl or butinyl radical, a cycloalkyl radical having up to six carbon atoms, which can also be bound by way of a methyl, ethyl, n-propyl or n-butyl radical, a benzyl or phenylethyl radical optionally mono- to tri-ring-substituted by chlorine, bromine, iodine, cyano, methyl, ethyl, nitro, or a phenyl radical optionally mono- to tri- substituted by chlorine, bromine, iodine, cyano, methyl, ethyl, methoxy, ethoxy, nitro, trifluoromethyl, and $R_1$ can moreover also represent hydrogen, whilst Y stands for oxygen or sulphur.

3. An imidazolidivetrionecarboxylic acid derivative according to claim 2 wherein Y represents oxygen, and wherein $R_1$ and $R_2$ independently represent methyl, ethyl, n-propyl, isopropyl, n-butyl, isobutyl, sec.butyl, tert.butyl, n-amyl, isoamyl, n-hexyl, chloroethyl, chloropropyl, bromoethyl, bromopropyl, allyl, methallyl, chloroallyl, bromoallyl, propargyl, cyclopropyl, cyclopropylmethyl, a benzyl radical optionally monosubstituted by chlorine, methyl or nitro, or a phenyl radical optionally mono- or disubstituted by chlorine, bromine, methoxy, methyl, and $R_1$ can moreover also represent hydrogen.

4. An imidazolidinetrionecarboxylic acid derivative according to claim 2 wherein Y represents sulphur, and wherein $R_1$ represents hydrogen, methyl, ethyl, n-propyl, isopropyl, n-butyl, isobutyl, sec.butyl, tert.butyl, n-amyl, isoamyl, n-hexyl, chloroethyl, chloropropyl, bromoethyl, bromopropyl, allyl, methallyl, chloroallyl, bromoallyl, propargyl, cyclopropyl, cyclopropylmethyl, benzyl, or a phenyl radical optionally mono- or disubstituted by chlorine, bromine, methoxy, methyl; and $R_2$ represents methyl, ethyl, n-propyl, isopropyl, n-butyl, isobutyl, sec.butyl, tert.butyl, n-amyl, isoamyl, a benzyl radical optionally monosubstituted by chlorine, methyl or nitro, or phenyl radical optionally mono- or disubstituted by chlorine, bromine, methyl, ethyl.

5. An imidazolidinetrionecarboxylic acid derivative according to claim 2 wherein Y represents oxygen, and one of the two substituents $R_1$ and $R_2$ represents an alkenyl radical and the other an alkyl radical, or both substituents represent an alkyl radical, with the number of carbon atoms of $R_1$ and $R_2$ together being between three and six.

6. An imidazolidinetrionecarboxylic acid derivative according to claim 2 wherein Y represents sulphur, and one of the two substituents $R_1$ and $R_2$ represents an alkenyl radical, and the other an alkyl radical, or both substituents represent an alkyl radical, with the number of carbon atoms of $R_1$ and $R_2$ together being between 3 and 6.

7. 1-Methyl-2,4,5-trioxoimidazolidine-3-carboxylic acid-ethyl ester according to claim 1.

8. 1-Methyl-2,4,5-trioxoimidazolidine-3-carboxylic acid-isopropyl ester according to claim 1.

9. 1-Methyl-2,4,5-trioxoimidazolidine-3-carboxylic acid-n-butyl ester according to claim 1.

10. 1-Methyl-2,4,5-trioxoimidazolidine-3-carboxylic acid-isobutyl ester according to claim 1.

11. 1-Ethyl-2,4,5-trioxoimidazolidine-3-carboxylic acid-methyl ester according to claim 1.

12. 1-Ethyl-2,4,5-trioxoimidazolidine-3-carboxylic acid-ethyl ester according to claim 1.

13. 1-Ethyl-2,4,5-trioxoimidazolidine-3-carboxylic acid-n-butyl ester according to claim 1.

14. 1-Ethyl-2,4,5-trioxoimidazolidine-3-carboxylic acid-isobutyl ester according to claim 1.

15. 1-Ethyl-2,4,5-trioxoimidazolidine-3-carboxylic acid-n-propyl ester according to claim 1.

16. 1-Methyl-2,4,5-trioxoimidazolidine-3-carboxylic acid-sec.butyl ester according to claim 1.

17. 1-Methyl-2,4,5-trioxoimidazolidine-3-thiocarboxylic acid-S-ethyl ester according to claim 1.

18. 1-Methyl-2,4,5-trioxoimidazolidine-3-thiocarboxylic acid-S-n-propyl ester according to claim 1.

19. 1-Ethyl-2,4,5-trioxoimidazolidine-3-thiocarboxylic acid-S-n-propyl ester according to claim 1.

20. 1-Methyl-2,4,5-trioxoimidazolidine-3-thiocarboxylic acid-S-n-butyl ester according to claim 1.

21. 1-Ethyl-2,4,5-trioxoimidazolidine-3-thiocarboxylic acid-S-n-butyl ester according to claim 1.

22. 1-Ethyl-2,4,5-trioxoimidazolidine-3-thiocarboxylic acid-S-isopropyl ester according to claim 1.

23. 1-Methyl-2,4,5-trioxoimidazolidine-3-thiocarboxylic acid-S-isopropyl ester according to claim 1.

24. 1-Ethyl-2,4,5-trioxoimidazolidine-3-thiocarboxylic acid-S-ethyl ester according to claim 1.

25. 1-Methyl-2,4,5-trioxoimidazolidine-3-thiocarboxylic acid-S-allyl ester according to claim 1.

26. 1-Ethyl-2,4,5-trioxoimidazolidine-3-thiocarboxylic acid-S-allyl ester according to claim 1.

27. 1-Methyl-2,4,5-trioxoimidazolidine-3-thiocarboxylic acid-S-sec.butyl ester according to claim 1.

28. 1-Ethyl-2,4,5-trioxoimidazolidine-3-thiocarboxylic acid-S-sec.butyl ester according to claim 1.

29. 1-Methyl-2,4,5-trioxoimidazolidine-3-thiocarboxylic acid-S-tert.butyl ester according to claim 1.

30. 1-Ethyl-2,4,5-trioxoimidazolidine-3-thiocarboxylic acid-S-tert.butyl ester according to claim 1.

31. 1-Ethoxycarbonyl-2,4,5-trioxoimidazolidine-3-carboxylic acid ethyl ester according to claim 1.

32. 1-Ethyl-2,4,5-trioxoimidazolidine-3-carboxylic acid-tetrahydrofurfuryl ester according to claim 1.

* * * * *